Feb. 22, 1966   R. D. SMITH   3,236,141
SCREW
Filed Nov. 5, 1963
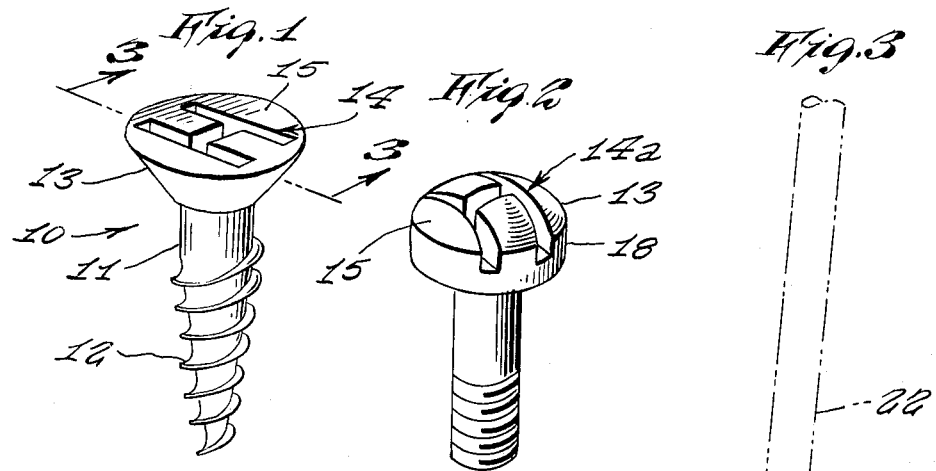
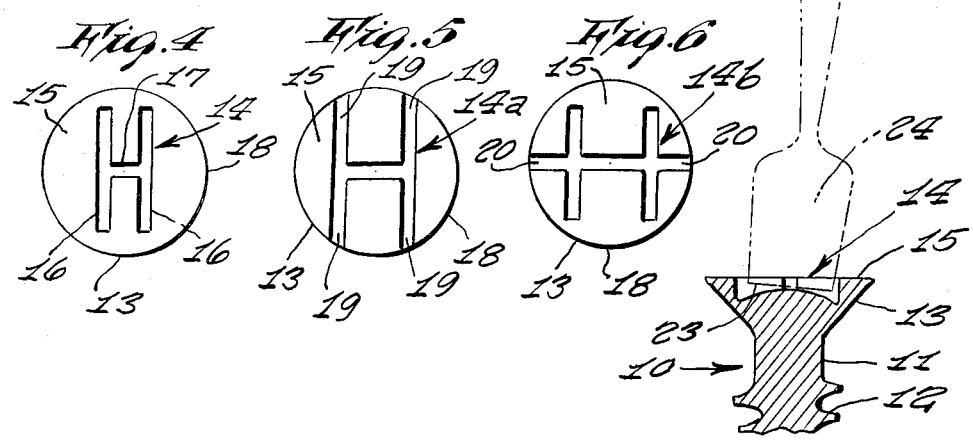
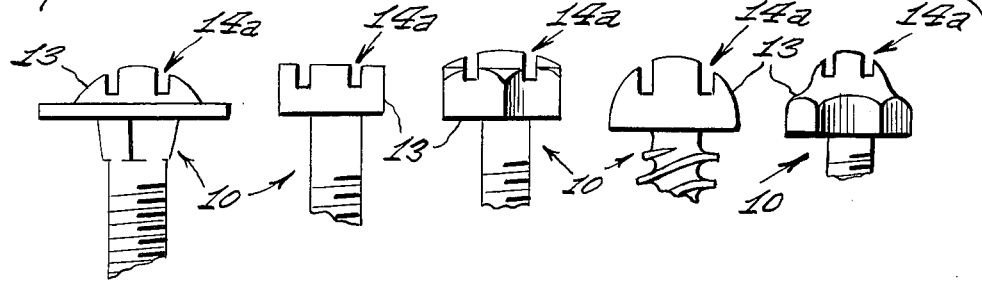
INVENTOR.
ROBERT D. SMITH United States Patent Office 3,236,141
Patented Feb. 22, 1966

3,236,141
SCREW
Robert D. Smith, 2742 E. Tremont Ave., Bronx, N.Y.
Filed Nov. 5, 1963, Ser. No. 321,544
3 Claims. (Cl. 85—45)

This application is a continuation-in-part of my prior application Serial No. 232,840, filed October 24, 1962.

This invention relates generally to screws. More specifically it relates to screw heads of internal wrenching type wherein there is a recess to receive a screw driving tool.

A principal object of the present invention is to provide an improved screw having a screw driving slot in the head thereof which has a configuration comprising a relatively long total linear length thus dividing the stress of the screw driving operation over the entire length and minimizing the stress at any one point, resulting in less possibility of stripping the edge of the slot as frequently happens with conventional screws.

Another object is to provide an improved screw having a screw driving slot in the head thereof which is designed to prevent the screw driving tool slipping readily out therefrom.

Another object is to provide an improved screw having a screw driver slot that can be easily machined or forged.

Other objects will be readily apparent from a study of the following specification and accompanying drawing wherein FIGURE 1 is a perspective view of the invention.

FIGURE 2 is a perspective view showing a modified form of the invention.

FIGURE 3 is a cross sectional view through 3—3 of FIGURE 1.

FIGURE 4 is a plan view of a screw head showing the invention.

FIGURE 5 is a similar view showing a modified form of the invention.

FIGURE 6 is a similar view showing still another modified form thereof.

FIGURE 7 is a fragmentary side elevation view showing the invention applied to various types of screws and bolts.

Referring now to the drawing in detail, the numeral 10 represents an improved screw according to the present invention wherein there is a shank 11 containing screw threads 12 and having a screw head 13 which contains a screw driver slot 14 within the upper side 15. The slot 14 is of generally H-shaped configuration, and comprising a pair of parallel spaced apart slot elements 16 which are connected together by means of a transverse cross-slot element 17.

As shown in FIGURES 1 and 4, the parallel slot elements may end within the peripheral confines of the upper side and not connect with the peripheral edge 18, thus retaining the strength of an unbroken edge.

As shown in FIGURES 2 and 5, the parallel slot elements of slot 14a may be made having their longitudinal ends 19 engaging the peripheral edge, if preferred.

In FIGURE 6 a further modified form of H-shaped configuration is shown wherein the slot 14b has a transverse cross-slot element having extended ends 20 which engage the peripheral edge.

It is to be noted that a screw driver of corresponding H-shaped configurated end (such as is described in applicant's copending application Serial No. 232,840) is to be preferably used for driving the screw with maximum efficiency, however, it is to be further noted that the present invention is adaptable for engagement also by an ordinary single blade screw driver if the other is not available.

As shown in FIGURES 1 and 2, the present invention is adaptable for either wood screws or machine bolt screws, and as shown in FIGURE 7 is adaptable for use on any type of head such as countersink head, round head, oval head, hex head, flat head, cap screws, stove bolts, carriage bolts and the like.

In FIGURE 3 a further incorporated feature of the invention is shown wherein the bottom 21 of the H-shaped slot is of crowned configuration having relatively deeper slot portions at the longitudinal ends of the slot elements. Thus there is less possibility of disengagement of the screw driver 22 during turning in case the screw driver is titled by chance. Thus, the raised end 23 of the blade 24 is still contained within the slot and the possibility of stripping or burring of the slot edge is made less. This is also advantageous when working in an unlighted area, where it is relatively difficult to relocate the slot in case the screw driver is accidentially disengaged therefrom.

In operative use the screw driver is engaged in the screw slot and turned in conventional manner.

Thus there has been provided a screw slot of relatively long total length for dividing the turning stress over a greater area.

While various changes may be made in the detail construction it shall be understood that such changes will be within the spirit and scope of the present invention as defined by the appended claims.

Having thus set forth by invention, what I desire to claim and secure by Letters Patent of the United States is:

1. In a threaded fastener the combination of a shank having a threaded portion, a head at one end of said shank said head having an upper side and a peripheral edge, said upper side having a slot for engagement by a screw driver, said slot being of H-shaped configuration having two parallel spaced apart slot elements which are connected together at their mid-parts by a transverse cross-slot element, each of said slot elements terminating within said peripheral edge, said parallel spaced apart slot elements having end walls generally perpendicularly to said upper side, each of said slot elements and said cross slot element being of straight configuration throughout their lengths, and having vertical opposite side walls and a flat bottom wall, said cross slot element being at 90° respective to each of said slot elements.

2. In a threaded fastener the combination of a shank having a threaded portion, a head at one end of said shank, said head having an upper side and a peripheral edge, said upper side having a slot for engagement by a screw driver, said slot being H-shaped configuration, having two parallel spaced apart slot elements which are connected together at their mid-parts by a transverse cross-slot element, said transverse cross-slot element extending through diametrically opposite portions of said peripheral edge, said parallel spaced apart slot elements terminating within said peripheral edge, each of said slot elements and said cross-slot element being of straight configuration throughout their lengths, and having vertical opposite side walls and a flat bottom wall, said cross slot element being at 90° respective to each of said slot elements.

3. In a screw the combination as set forth in claim 2 wherein said H-shaped slot has a bottom wall that forms a right angle with said side walls, References Cited by the Examiner
UNITED STATES PATENTS

| 172,351 | 1/1876 | Sloan | 85—45 |
| 847,774 | 3/1907 | Hoffman | 85—45 |
| 3,106,862 | 10/1963 | Briles | 85—45 |

FOREIGN PATENTS 1,745 11/1889 Switzerland.

EDWARD C. ALLEN, Primary Examiner.